United States Patent [19]
Hubbard et al.

[11] Patent Number: 6,071,624
[45] Date of Patent: Jun. 6, 2000

[54] LITHIUM AND POTASSIUM COPOLYSILICATE BARRIER COATINGS

[75] Inventors: Michael A. Hubbard, Somerset; James A. McCaulley, Ringoes; Frank P. Battito, West Orange; Douglas R. Holcomb, South Orange, all of N.J.

[73] Assignee: Hoechst Trespaphan GmbH, Germany

[21] Appl. No.: 09/160,495

[22] Filed: Sep. 24, 1998

Related U.S. Application Data

[60] Division of application No. 08/857,923, May 16, 1997, Pat. No. 5,882,798, which is a continuation-in-part of application No. 08/652,287, May 22, 1996, abandoned.

[51] Int. Cl.$^7$ .............................. B32B 9/04; B32B 13/04
[52] U.S. Cl. .................. 428/446; 428/475.5; 428/480; 428/521; 428/523
[58] Field of Search ................... 428/446, 475.5, 428/480, 521, 523

[56] References Cited

U.S. PATENT DOCUMENTS

| | | |
|---|---|---|
| 1,949,914 | 1/1934 | Larson . |
| 2,998,328 | 8/1961 | Munger et al. . |
| 3,102,038 | 8/1963 | Fisher, Jr. . |
| 3,130,061 | 4/1964 | McMahon et al. . |
| 3,180,747 | 4/1965 | Patton et al. . |
| 3,282,729 | 11/1966 | Richardson et al. . |
| 3,492,137 | 1/1970 | Iler . |
| 3,522,066 | 7/1970 | Forsyth . |
| 3,533,816 | 10/1970 | Oken . |
| 3,706,603 | 12/1972 | Vessey et al. . |
| 3,884,863 | 5/1975 | Beers et al. . |
| 4,101,050 | 7/1978 | Buckler et al. . |
| 4,247,576 | 1/1981 | Kutner . |
| 4,466,831 | 8/1984 | Murphey . |
| 4,466,832 | 8/1984 | Yoshimura . |
| 4,503,158 | 3/1985 | Richard . |
| 4,537,866 | 8/1985 | Gilson . |
| 4,681,818 | 7/1987 | Unnam . |
| 4,945,074 | 7/1990 | Blount . |
| 5,049,609 | 9/1991 | Patitsas . |
| 5,055,137 | 10/1991 | Holcombe . |
| 5,130,110 | 7/1992 | Rouet . |
| 5,164,003 | 11/1992 | Bosco et al. . |
| 5,183,704 | 2/1993 | Bohrn et al. . |
| 5,238,668 | 8/1993 | Novotny . |
| 5,244,729 | 9/1993 | Harrison et al. . |
| 5,344,633 | 9/1994 | Sorensson . |
| 5,354,548 | 10/1994 | Araya . |
| 5,462,779 | 10/1995 | Misiano . |
| 5,503,820 | 4/1996 | Moffett . |
| 5,560,773 | 10/1996 | Gimvang . |
| 5,565,273 | 10/1996 | Egli . |
| 5,575,953 | 11/1996 | Tachizono . |
| 5,853,830 | 12/1998 | McCaulley et al. . |

FOREIGN PATENT DOCUMENTS

| | | |
|---|---|---|
| 993738 | 7/1976 | Canada . |
| 518646 | 12/1992 | European Pat. Off. . |
| 518647 | 12/1992 | European Pat. Off. . |
| 718202 | 1/1995 | Japan . |
| 1007482 | 10/1965 | United Kingdom . |
| 1424425 | 2/1976 | United Kingdom . |
| 1532847 | 11/1978 | United Kingdom . |

OTHER PUBLICATIONS

H. van Olphen, "Clay Minerology", *An Intro. To Clay Colloid Chemistry*, 27:69–71 (1963).
H. H. Weldes & K.R. Lange, "Properties of Soluble Silicates", *Indus. Engin. Chem.*, 61(4):29–44 (Apr. 1969).
W. J. Ward et al, "Gas Barrier Improvement Using Vermiculite & Mica in Polymer Film", *J. Membrane Sci.*, 55:173–180 (1991).
N. R. Horikawa et al, "Drying and Water Resistance of Silicate Films", *Adhesives Age*,10(7):30–34 (1967).
Database WPI Section CH, Week 9439, Derwent Publications Ltd., London, GB; Class A26, AN 94–313903 XP002040546 & JP 06 240 174 A (Asahi Kagaku Kohyo KK) Aug. 30, 1994.
Patent Abstracts of Japan, vol. 095, No. 004, May 31, 1995 & JP 07 018202 A Agency of Ind. Science & Technol., Jan. 20, 1995.

*Primary Examiner*—Helen L. Pezzuto
*Attorney, Agent, or Firm*—Howson and Howson

[57] ABSTRACT

A method and novel barrier coating solutions are provided for imparting improved vapor, gas or aroma permeability characteristics to a coated polymeric substrate. The method and solutions employ a lithium-potassium copolysilicate of the formula $(Li_2O)_x(K_2O)_{1-x}(SiO_2)_y$. For the method, y is between 1 and 10, if x is less than 1; or y is greater than 4.6, if x is 1. For the novel coating solutions, y is greater than 4.6 if x is less than 1; or x is greater than 0.5 if y is between 1 and 10.

14 Claims, 1 Drawing Sheet

LITHIUM AND POTASSIUM COPOLYSILICATE BARRIER COATINGS

CROSS-REFERENCE TO OTHER APPLICATIONS

This is a divisional of pending U.S. patent application Ser. No. 08/857,923, filed May 16, 1997, now U.S. Pat. No. 5,882,798, which is a continuation-in-part of U.S. patent application Ser. No. 08/652,287, filed May 22, 1996, now abandoned.

FIELD OF THE INVENTION

The present invention relates generally to silicate-based barrier coatings for polymeric articles.

BACKGROUND OF THE INVENTION

Alkali metal polysilicates have long been known as protective coatings that modify the permeability or surface characteristics of polymeric films and other articles. Lithium (Li), sodium (Na), and potassium (K) polysilicates are known to be effective as protective coatings for a variety of surfaces. For example, Japanese Patent Publication No. H7-18202, published Jan. 20, 1995 refers to a water-insoluble, coating material and binder for use on metals, synthetic resins, glass, wood, cement, etc, which contains mixtures of an aqueous solution of sodium or potassium silicate and an aqueous solution of lithium silicate, where the ratio of the sodium or potassium silicate to lithium silicate is in the range of 1–3.

As another example, Hecht and Iler, Canadian Patent No. 993,738, describe a gas and liquid-impermeable coating for polymeric substrates comprising lithium polysilicate having a mole ratio of $SiO_2$ to $Li_2O$ of about 1.6 to 4.6. However, polymeric articles are known to become hazy after certain polysilicate coatings have been incorporated. The tendency of sodium (Na) polysilicate coatings to effloresce, i.e., to become covered by powdery crystalline material as a result of atmospheric exposure, has been documented [Weldes and Lange, *Ind. Eng. Chem.*, 61(4):28–44 (1969)]. This characteristic has similarly been observed for lithium polysilicate coatings by the present inventors. In contrast, pure potassium polysilicate coatings do not effloresce, but suffer severe loss of barrier performance above 50% relative humidity. Pure lithium polysilicate coatings, on the other hand, exhibit little or no loss of barrier performance over the same relative humidity range.

There remains a need in the art of barrier coatings for coating compositions and methods which overcome the above deficiencies, and are widely available as vapor, gas and/or aroma barriers for polymeric articles, e.g., packaging products.

SUMMARY OF THE INVENTION

In one aspect, the present invention provides a method for providing improved vapor, gas and aroma barrier properties at high relative humidities to a polymeric substrate. The method involves coating the substrate with a barrier coating solution containing a lithium-potassium copolysilicate of the formula $(Li_2O)_x(K_2O)_{1-x}(SiO_2)_y$ wherein x is the mole fraction of $Li_2O$ in the combined alkali metal oxides ($M_2O$), and y is the $SiO_2:M_2O$ mole ratio. In this method, x ranges from 0 to 1, inclusive. Specifically, if x is less than 1, y is between 1 and 10; and if x is 1, y is greater than 4.6.

In another aspect, the present invention provides a novel vapor, gas and/or aroma barrier coating solution for polymeric articles comprising a copolysilicate of the above formula, which overcomes deficiencies in the art. The aforementioned coating solution is represented by the general formula above, except that y is greater than 4.6 if x is less than 1, and x is greater than 0.5, if y is between 1 and 10. The coating solution is preferably colorless or transparent and can contain a suitable surfactant.

Another aspect of this invention provides a polymeric article coated with the above described barrier coating solution. The article may be typically a polymer film or membrane, such as those employed in the packaging of foodstuffs, a sheet, or a rigid or semi-rigid container, e.g., a bottle.

Other aspects and advantages of the present invention are described in the detailed description below and in the claims.

DETAILED DESCRIPTION OF THE INVENTION

Figure 1:
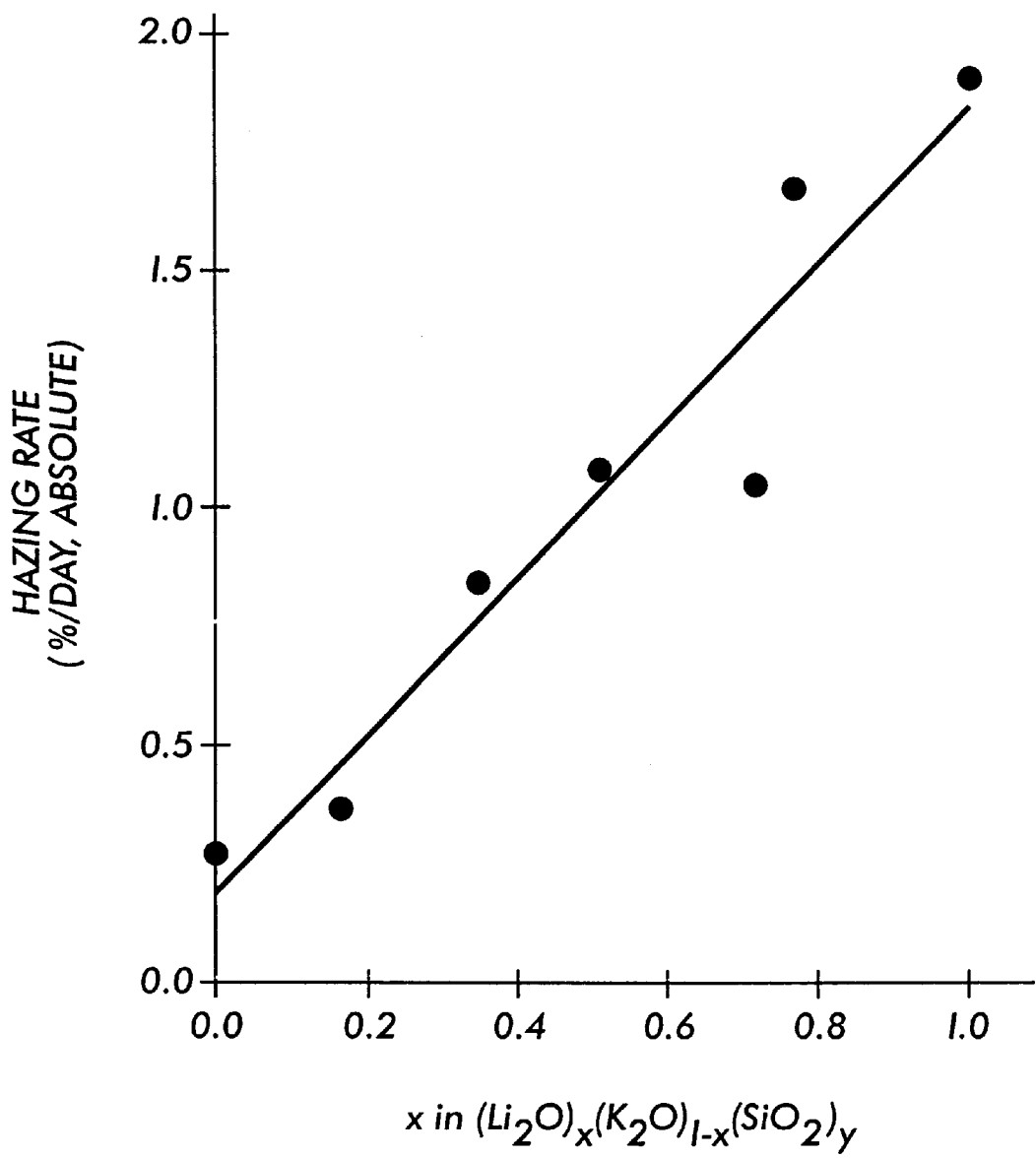
FIG. 1 is a graph of the hazing rate (in absolute percentage per day, i.e., a value of one indicates an increase of, for example, from 5% to 6% haze in a single day) vs. the mole fraction x of $Li_2O$ in the copolysilicate $(Li_2O)_x(K_2O)_{1-x}(SiO_2)_y$. This figure depicts the dependence of the hazing rate on the amount of lithium in the coating composition.

The present invention overcomes the deficiencies in prior art vapor barrier coatings. This invention includes a method for providing improved vapor, gas, and/or aroma barrier properties at high relative humidities to polymeric substrates using coating solutions containing a lithium-potassium co-polysilicate. The invention also provides novel coating solutions for the substrate as well as improved coated articles. The coating solutions used in the present method provide excellent vapor, gas and aroma barrier characteristics at high relative humidity in comparison with pure potassium polysilicates, and exhibit markedly reduced rates of efflorescence in comparison with pure lithium polysilicates.

I. Definitions

The term "vapor" implies a liquid at partial pressure, such as water vapor. The term "gas" includes oxygen, nitrogen, carbon dioxide and others. "Aroma" includes those materials which bear a fragrance, for example, menthol and others. For simplicity, as used herein, the term "vapor barrier" can be interpreted to mean a barrier to gases and aromas as well as traditionally defined vapors.

Similarly as used herein, the term "solution" is interpreted to include colloidal dispersions and suspensions. By "colloidal dispersion or suspension" is meant any dispersion or suspension of particles in liquid, the particles being of a size greater than molecular scale that do not settle out. Generally the particle size in a suspension or dispersion of this invention are from about 10 to about 50,000 Angstroms. "Coating solution" as used herein is meant a liquid containing dissolved or suspended solids that do not settle out and which is used to apply said solids to a substrate.

II. The Invention

The method of the invention specifically involves coating a polymeric substrate with a barrier coating solution containing a lithium and potassium copolysilicate. The coating solution contains a copolysilicate, i.e., a mixture of two different alkali metal polysilicates. More specifically, the coating solutions result from a mixture of lithium and potassium polysilicates. These coating solutions are characterized by copolysilicate of the general formula $(Li_2O)_x (K_2O)_{1-x}(SiO_2)_y$, in which the mole fraction of $Li_2O$ is x and the molar ratio of $SiO_2$ to $M_2O$ is y. In the coating solutions useful in the method of the present invention, the co-polysilicate is one in which y is between 1 and 10, if x is less than 1, or y is greater than 4.6 if x is 1.

Certain novel coating solutions for use in the above-described method are provided by the formula above, in which y is greater than 4.6 if x is less than 1; or x is greater than 0.5 if y is between 1 and 10. More preferably, a novel coating solution of this invention is characterized by a value of x between 0.5 and 1 and a value of y between 4.6 and 10.

Coating solutions useful in the method, as well as the novel coating solutions of this invention, can also contain a suitable surfactant to reduce surface tension. Surfactants can be anionic, cationic and non-ionic, and many surfactants of each type are available commercially. Preferably, the surfactant useful in the methods and solutions of this invention is nonionic. A suitable surfactant for inclusion in these compositions possesses a critical micelle concentration sufficiently low to ensure a dried coating uncompromised by residual surfactant. Most preferably, the surfactant is selected from the group consisting of acetylenic glycols (e.g., such as those provided commercially by Air Products) and alkyl ethoxylates (such as those provided commercially by Hoechst Celanese and many others). The amount of surfactant added to the coating solution or composition will depend on the particular surfactant selected, but should be the minimum amount of surfactant that is necessary to achieve wetting of the polymer substrate while not compromising the performance of the dried coating. For example, typical surfactant amounts can be less than or equal to about 0.1% by weight of an acetylenic glycol or an alkyl ethoxylate.

A typical coating solution according to this invention is preferably colorless and transparent. A coating solution of the invention may be prepared from commercially available lithium polysilicate and potassium polysilicate solutions. For example, a commercially available colloidal suspension of lithium polysilicate may be blended with a commercially available potassium polysilicate colloidal suspension to make the coatings of the present invention. It should be noted that one can prepare the coating solutions of the invention by using the "parent" products which are used to produce the commercially available polysilicates. However, such preparation is well-known and unnecessary in view of the commercial availability of the lithium and potassium polysilicate solutions.

As illustrated in Example 1 below, one exemplary commercially available product bearing the trademark Inobond® Li 2043 (van Baerle & Cie AG) is an aqueous colloidal suspension of lithium polysilicate which contains ~24.5% by weight silicon dioxide and ~3.0% by weight lithium oxide. Another useful product bears the trademark K-4009 (van Baerle & Cie AG) and is an aqueous colloidal suspension containing ~26.8% by weight silicon dioxide and ~13% by weight potassium oxide. Such components are then mixed with water to produce a desired solids content.

The molar ratio, y, of $SiO_2$:$M_2O$ of the dried coatings may be determined by the molar ratios of $SiO_2$:$Li_2O$ and $SiO_2$:$K_2O$ in the starting alkali metal polysilicates. One may, however, desire to modify the overall $SiO_2$:$M_2O$ mole ratio in the copolysilicate coating. This may be accomplished by the addition of aqueous suspensions of colloidal silica to the coating solution. As described in Example 4, below, one exemplary commercially available product bearing the trademark Ludox® AS-30 (DuPont Specialty Chemicals) is an aqueous colloidal suspension of silicon dioxide which contains 30% by weight solids. Such colloidal dispersions are available under a variety of trademarks including Ludox® (DuPont Specialty Chemicals) and Klebosol® (Societe Francaise Hoechst).

While a typical useful solids content for coating solutions of this invention is up to about 25% by weight of solids, the desired solids content depends entirely on the coating method used, and may be readily adjusted by techniques well known to the art to achieve a desired coating thickness of the dry coating on the selected substrate. For example, coating on a thin film or sheet are desirably between about 200 to about 500 nm of dry coating, and more preferably about 300 nm. Coatings on rigid or semi-rigid containers are desirably from about 100 to about 1000 nm of dry coating. Such an adjustment is well within the skill of the art [see, e.g., Canadian Patent No. 993,738].

The vapor barrier coating mixtures are then subjected to a period of stirring and, optionally, filtration. Optionally, a surfactant may be added at this stage to reduce the surface tension of the coating solution. For example, the commercially available Genapol® 26-L-60N nonionic surfactant (Hoechst Celanese) or other surfactants represented by trademarks such as Genapol® UD050 [Hoechst] and Dynol 604® may be added at this stage. The vapor barrier coating solution is thus ready to be applied to a polymeric surface or substrate.

The lithium-potassium copolysilicate coatings of the invention can be used on a variety of polymeric surfaces and articles to improve (i.e., reduce) the permeability of the products to vapors, such as oxygen, carbon dioxide, nitrogen and others. Typical organic aromas and vapors include, but are not limited to, d-limonene, cinnamaldehyde, vanillin, menthol, gasoline, perfume fragrances, and the like. These coatings are particularly advantageous where the polymers used to prepare the article or substrate do not provide sufficient vapor, gas, or aroma impermeability for the desired application.

Suitable substrates to be coated with the above-described coating solutions include substrates formed of polymers including polyesters, such as poly(ethylene terephthalate) (PET); polyolefins, particularly polypropylene, polystyrene, polyethylene and cycloolefins (COC), such as a copolymer of ethylene and norbornene [U.S. Pat. No. 5,087,677]; and polyamides, such as nylon. The articles coated by these coatings include, without limitation, polymeric films and sheets, rigid and semi-rigid containers, and other surfaces. Especially preferred articles for coating according to this invention include polypropylene films, PET films, nylon films, films used in covering food products (e.g., meats, poultry, etc.), beverage bottles, plastic containers, jars, blisterpacks and lidstocks, made of the foregoing polymers.

The polymeric articles to be coated by the compositions of the invention may be previously untreated. Optionally, the polymeric article, such as a film or bottle, may be first plasma treated to improve wetting and adhesion by the barrier coating as described in the following Example 1. Alternatively, the polymeric article may be corona-treated by the industry-wide corona discharge treatment method. In instances where corona-treatment of the polymer does not cause suitable wetting of the coating on the polymer, a suitable primer may be first applied to the polymeric article. For example, in the case of polypropylene, a primer solution of poly(vinyl alcohol) or poly(hydroxystyrene) may be used to improve wetting of the barrier coating solutions on the polymer.

The polymer may also have been flame treated, or chemically etched and oxidized prior to the application of the coating solution of this invention.

The substrate may be a film that contains on at least one side a heat seal layer. Such heat seal layers may be made of an ethylene-propylene copolymer or ethylene-propylene-butylene terpolymer. Thus, the coating solution is applied on the surface of the heat seal layer. Alternatively, where a film contains one side coated with the heat seal layer, the coating solution of the present invention can be applied to the surface of the film opposite the surface coated with the heat seal layer. The polymeric substrate or article may also comprise a protective topcoat layer. The coatings of this invention may be applied over the topcoat layer.

The coatings of this invention may be applied to the selected polymeric surface or article by conventional coating techniques known to those of skill in the art. These techniques include, without limitation, roll coating, spray coating, and dip coating techniques. Roll coating techniques include, but are not limited to, rod, reverse roll, forward roll, air knife, knife over roll, blade, gravure and slot die coating methods. General descriptions of these types of coating methods may be found in texts, such as Modern Coating and Drying Techniques, (E. Cohen and E. Gutoff, eds; VCH Publishers) New York (1992) and Web Processing and Converting Technology and Equipment, (D. Satas, ed; Van Nostrand Reinhold) New York (1984). Three dimensional articles may be coated by spray coating or dip coating. The method of application is not a limitation on the present invention, but may be selected from among these and other well-known methods by the person of skill in the art.

After coating, the coated product must be dried at a selected temperature of room temperature or greater than room temperature. The selection of the drying temperature depends on the desired time for drying; that is, accelerated drying times may be achieved at elevated temperatures which would not be necessary if a longer time period for drying was acceptable. One of skill in the art can readily adjust the oven temperature and drying time as desired. The performance of the dried vapor barrier coating is insensitive to the drying temperature over the range 25–200° C. A significant advantage of the present coatings and method is that low temperature (<100° C.) drying makes this process compatible with requirements of biaxially oriented polypropylene (BOPP) film processing.

The compositions and methods of this invention are further illustrated by the following examples, which are not intended to limit the scope of this invention.

EXAMPLE 1

Variation of Lithium Oxide Mole Fraction in Copolysilicate Coatings on Biaxially Oriented Pet Film A. Preparation of Coating Solutions A series of seven lithium-potassium copolysilicate barrier coating solutions of the invention were prepared, as indicated in Table 1. The compositions of these polysilicate coatings of the invention are expressed as the mole fraction, x, of $Li_2O$ in the copolysilicate $(Li_2O)_x(K_2O)_{1-x}(SiO_2)_y$, with values of x ranging from 0 to 1. With continuous stirring, Inobond® Li 2043 lithium polysilicate solution (van Baerle & Cie AG) having 3.0% w/w $Li_2O$ and 24.5% w/w $SiO_2$, was mixed with water. K-4009 potassium poly-silicate solution (van Baerle & Cie) having 13.0% w/w $K_2O$ and 26.85% w/w $SiO_2$ was added to the lithium polysilicate solution. Genapol® 26-L-60N nonionic surfactant (Hoechst Celanese), as a 1% by weight solution in water, was then added to improve wetting of the poly(ethylene terephthalate) (PET) substrates. Each coating mixture in Table 1 was stirred overnight then filtered through diatomaceous earth. The resulting coating solutions had 15% total solids and 0.01% surfactant. The $SiO_2:M_2O$ mole ratio, y, ranged from 3.24 at x=0 to 4.05 at x=1.0.

TABLE 1

Recipes for Preparing a Series of Lithium-Potassium Copolysilicates for Barrier Coatings

| Solution No. | Mass of Inobond® Li 2043 (g) | Mass of K-4009 (g) | Mass of $H_2O$ (g) | Mass of 1.0% Genapol® 26-L-60N (g) | Mole Fraction x of $Li_2O$ | $SiO_2$: $M_2O$ mole ratio |
|---|---|---|---|---|---|---|
| 1 | 0 | 75.3 | 122.7 | 2.0 | 0.00 | 3.24 |
| 2 | 17.7 | 63.0 | 117.3 | 2.0 | 0.17 | 3.38 |
| 3 | 35.7 | 50.6 | 111.7 | 2.0 | 0.34 | 3.51 |
| 4 | 53.1 | 38.8 | 106.1 | 2.0 | 0.50 | 3.64 |
| 5 | 70.6 | 26.5 | 100.9 | 2.0 | 0.66 | 3.77 |
| 6 | 89.6 | 13.4 | 95.0 | 2.0 | 0.83 | 3.91 |
| 7 | 109.1 | 0 | 88.9 | 2.0 | 1.00 | 4.05 |

B. Preparation of Coated Films

Four inch circles were cut from PET film (Hoechst Diafoil, Hostaphan® 2400, 0.5 mil thick) with a scalpel. Any dust on the film was blown off with a jet of clean, filtered air. The samples were then plasma treated to improve wetting by copolysilicate coating solutions and adhesion of dried copolysilicate coatings. Plasma treatment was performed using a Plasma Preen microwave reactor operated at 50% power with 2 Torr of oxygen. The treatment duration was 5 s. Approximately 10 g of coating solution was dispensed on the PET film before spinning at 2000 rpm for 10 s. The coated films were dried in an oven maintained at 50° C. for ~30 s.

Several coated film samples were prepared with each coating solution described in Table 1. Separate samples were selected for accelerated aging/haze measurements and oxygen transmission rate (OTR) measurements as a function of relative humidity.

C. Measurement of Haze Formation

Optical haze was measured with a spectrophotometer (MacBeth Color-Eye 7000) conforming to ASTM D 1003-61. Samples were characterized shortly after spin-coating and then placed in an environmental chamber (Tenney T H Jr.) maintained at 80° C. and 85% relative humidity. Samples were periodically removed from the chamber for haze measurement over a period of two weeks.

The initial linear rate of haze formation by efflorescence is calculated by least-squares fit to a plot of % haze vs. time. At longer times the % haze reaches a plateau, with the plateau value proportional to the lithium content of the copolysilicate coating. FIG. 1 depicts the dependence of the initial rate of haze development on coating composition. The hazing rate increases linearly with increasing lithium content.

D. Measurement of Oxygen Transmission Rates

The barrier performance of the coated film samples was assessed by measurement of the OTR. OTR measurements were performed using a Mocon Oxtran 2000 instrument. Table 2 presents OTR values at 30° C. (OTR units: $cm^3/[m^2$ atm day]) vs. relative humidity for a series of $(Li_2O)_x(K_2O)$ $_{1-x}(SiO_2)_y$ copolysilicate barrier coatings on 0.5 mil PET film.

TABLE 2

Oxygen Transmission Rates (cm³/[m² day atm]) of Lithium-Potassium Copolysilicate Barrier Coatings on 0.5 mil thick PET film vs. Composition and Relative Humidity

| Mole Fraction x of $Li_2O$ | Relative Humidity | | | | | |
|---|---|---|---|---|---|---|
| | Dry | 40% | 60% | 70% | 80% | 90% |
| 0.00 | 13.1 | 9.5 | 75.4 | 115.8 | 132.1 | 131.6 |
| 0.17 | 4.5 | 4.5 | 5.9 | 33.1 | 87.2 | 128.4 |
| 0.34 | 3.1 | 3.1 | 3.0 | 1.8 | 42.0 | 101.1 |
| 0.50 | 3.7 | 3.2 | 3.1 | 2.7 | 14.3 | 17.7 |
| 0.66 | 7.7 | 4.9 | 4.2 | 3.0 | 3.1 | 15.5 |
| 0.83 | 15.5 | 6.5 | 5.8 | 5.4 | 2.2 | 12.7 |
| 1.00 | 14.8 | 8.8 | 7.9 | 7.5 | 5.4 | 13.5 |

Copolysilicate coatings containing little lithium (x<0.34) suffer severe loss of barrier performance at high humidity. Copolysilicate coatings, where 0.5<x<1, provide good barrier performance at high humidity on PET film while, as shown in FIG. 1, having significantly reduced susceptibility to efflorescence, as compared to a lithium polysilicate coating.

EXAMPLE 2

Variation of the Lithium Oxide Mole Fraction of Copolysilicate Coatings on Biaxially Oriented Pet Film A. Preparation of Solutions A series of three lithium-potassium copolysilicate barrier coating solutions was prepared using the following recipe and quantities listed in Table 3. As in Example 1, the value x refers to the mole fraction x of $Li_2O$ in the copolysilicate $(Li_2O)_x(K_2O)_{1-x}(SiO_2)_y$. With continuous stirring, Inobond® Li 2043 was mixed with distilled water. K-4009 potassium polysilicate solution was added with stirring to the lithium polysilicate solution. The resulting coating solutions had 10% total solids. The $SiO_2:M_2O$ mole ratio, y, ranged from 3.51 at x=0.33 to 3.78 at x=0.67. Analogous solutions containing 10% solids of the individual alkali metal polysilicates were prepared as comparative samples.

B. Preparation of Coated Film

Four inch circles were cut from biaxially oriented PET film (Hoechst Diafoil, Hostaphan® 2400, 0.5 mil thick), with a scalpel. Any dust on the film was blown off with a jet of clean, filtered air. The samples were then plasma treated with a Plasma Preen microwave reactor operated at 50% power and 2 Torr of oxygen. The treatment time was 5 s. Approximately 10.0 g of coating solution was dispensed onto the polymer film. A spreading spin cycle of 2 s at 350 rpm was followed by a spin cycle of 10 s at 2000 rpm. The coated films were dried in an oven maintained at 50° C. for about 30 s. Several coated film samples were prepared with each coating solution described in Table 3.

TABLE 3

Recipes for the Preparation of Lithium-Potassium Copolysilicate Barrier Coatings

| Solution No. | Mole Fraction x of $Li_2O$ | $SiO_2:M_2O$ Mole Ratio | Mass of Inobond® Li 2043 (g) | Mass of K-4009 (g) | Mass of Water (g) |
|---|---|---|---|---|---|
| 1 | 0.00 | 3.24 | — | 125.5 | 374.5 |
| 2 | 0.33 | 3.51 | 57.8 | 85.6 | 356.6 |
| 3 | 0.50 | 3.64 | 88.4 | 64.5 | 347.1 |
| 4 | 0.67 | 3.78 | 119.6 | 43.0 | 337.5 |
| 5 | 1.00 | 4.05 | 181.8 | — | 318.2 |

C. Measurement of Oxygen Transmission Rate

Oxygen transmission rates were measured using a Mocon Oxtran 2000 instrument. Table 4 presents the oxygen transmission rate results for copolysilicate coated PET film as a function of relative humidity. As a point of reference, uncoated Hostaphan® 2400 grade PET film (0.5 mil) possesses an oxygen transmission rate of approximately 170 cm³/[m² day atm] when tested at 30° C. and 0% relative humidity. The OTR reduction for this example is significantly better than the data in Example 1.

TABLE 4

Oxygen Transmission Rates of Lithium-Potassium Copolysilicate Barrier Coatings on 0.5 mil thick PET film vs. Composition and Relative Humidity

| Mole Fraction x of $Li_2O$ | Relative Humidity (%) | $O_2$ Transmission Rate (cm³/[m² day atm] at 30° C.) |
|---|---|---|
| 0.00 | 0 | 3.72 |
| 1.00 | 0 | 0.41 |
| 0.00 | 90 | 126 |
| 1.00 | 90 | 2.75 |
| 0.00 | 60 | 38 |
| 1.00 | 30 | 0.43 |
| 0.33 | 0 | 1.29 |
| 0.67 | 0 | 0.11 |
| 0.50 | 45 | 1.04 |
| 0.50 | 45 | 0.02 |

EXAMPLE 3

Variation of Lithium Oxide Mole Fraction in Copolysilicate Coatings on Biaxially Oriented Polypropylene Film A. Preparation of Solutions A series of three lithium-potassium copolysilicate barrier coating solutions were prepared as described in Example 2. Analogous solutions containing 10% solids of the individual alkali metal polysilicates were prepared as comparative samples. Additionally a priming solution consisting of poly (p-hydroxystyrene) in aqueous base was prepared by adding in order, with stirring, 4.19 g of lithium hydroxide monohydrate and 1.00 g polymer grade poly(p-hydroxystyrene) in sufficient distilled water to make 100.0 ml of solution. The resulting solution contained 1% by weight poly(p-hydroxystyrene) in 0.1 N aqueous lithium hydroxide.

B. Preparation of Coated Film

Four inch circles were cut from biaxially oriented polypropylene film (Trespaphan® FND 30, 1.2 mil thick) with a scalpel. Any dust on the film was blown off with a jet of clean, filtered air. The samples were then plasma treated with a Plasma Preen microwave reactor operated at 50% power and 2 Torr of oxygen. The treatment time was 5 s. Approximately 10 g of poly(p-hydroxystyrene) primer solution was dispensed onto the polymer film. A spreading spin cycle of 2 s at 350 rpm was followed by a spin cycle of 10 s at 2000 rpm. The primed films were dried in an oven maintained at 50° C. for about 30 s. Subsequently, approximately 10 g of lithium-potassium copolysilicate barrier coating solution was dispensed onto the primed polymer film. A spreading spin cycle of 2 s at 350 rpm was followed by a spin cycle of 10 s at 2000 rpm. The coated films were dried in an oven maintained at 50° C. for about 30 s.

Several coated film samples were prepared with each coating solution described in Table 3. As comparative samples, films were also prepared in which the copolysilicate coating step was omitted.

C. Measurement of Oxygen Transmission Rates

Oxygen transmission rates were measured using a Mocon Oxtran 2000 instrument. Table 5 presents the oxygen transmission rate results for copolysilicate barrier coated biaxially oriented polypropylene film (1.2 mil thick) as a function of relative humidity. As a point of reference, uncoated FND 30 grade polypropylene possesses an oxygen transmission rate of approximately 1700 cm$^3$/[m$^2$ day atm] when tested at 30° C. and 0% relative humidity, essentially the same as the value obtained for primed but uncoated film as shown in Table 5.

TABLE 5

Oxygen Transmission Rates of Lithium-Potassium Copolysilicate Barrier Coatings on 1.2 mil thick BOPP film vs. Composition and Relative Humidity

| Mole Fraction x of Li$_2$O | Relative Humidity (%) | O$_2$ Transmission Rate (cm$^3$/[m$^2$ day atm] at 30° C.) |
|---|---|---|
| 0.00 | 0 | 401 |
| 1.00 | 90 | 44 |
| 0.00 | 90 | 1597 |
| 1.00 | 30 | 711 |
| 0.00 | 60 | 157 |
| 1.00 | 0 | 1217 |
| 0.67 | 0 | 1190 |
| 0.33 | 90 | 400 |
| 0.50 | 45 | 45 |
| Primed film with no copolysilicate coating | 0 | 1661 |

EXAMPLE 4

Variation of Silica:Metal Oxide Mole Ratio in Copolysilicate Coatings Containing Equimolar Amounts of Lithium and Potassium Oxides Example 1 demonstrates that the rate of haze formation by efflorescence in lithium polysilicate barrier coatings can be reduced by adding potassium silicate. Addition of potassium silicate, however, compromises the excellent oxygen barrier performance of lithium silicate coatings at high humidity. A balance of low efflorescence rate and satisfactory barrier performance at high humidity is achieved with approximately equimolar lithium-potassium copolysilicate blends.

A copolysilicate barrier coating with a lithium:potassium mole ratio of one produced from K-4009 (SiO$_2$:K$_2$O=3.24) and Li 2043 (SiO$_2$:Li$_2$O=4.06), has a SiO$_2$:M$_2$O mole ratio, y, of 3.64. In this experiment, y was increased by either: (1) using a potassium polysilicate solution with a higher SiO$_2$:K$_2$O mole ratio or (2) adding colloidal silica. The first approach permits y of the present copolysilicate coatings to be increased from 3.64 to 4.0. The upper limit of y is dictated by the SiO$_2$:K$_2$O mole ratio of commercially available potassium polysilicate coating solutions. The second approach, adding colloidal SiO$_2$, permits solutions of even higher y value to be prepared.

A. Preparation of Coating Solutions

In this example, the source of lithium polysilicate was Inobond® Li 2043. The source of potassium polysilicate was either K-4009 or KASIL® #1 potassium polysilicate solution (PQ Corporation) having 8.30% w/w K$_2$O and 20.8% W/W SiO$_2$. The colloidal silica source was chosen from the list of Ludox® colloidal silica suspensions (DuPont Specialty Chemicals) described in Table 6. Dupont's Ludox® CL-X silica is encapsulated in Al$_2$O$_3$. Equivalent products marketed under the tradename Klebasol®, are available from Societe Francaise Hoechst.

TABLE 6

Description of Dupont Specialty Chemicals Ludox ® Brand Colloidal Silicas

| Colloidal Silica Grade | Counterion | % Solids | Particle Size (nm) |
|---|---|---|---|
| Ludox ® HS-40 | sodium | 40.0 | 12 |
| Ludox ® AS-30 | ammonium | 30.0 | 22 |
| Ludox ® CL-X | sodium (Al$_2$O$_3$) | 45.0 | 22 |

A series of lithium-potassium copolysilicate barrier coating solutions with a Li$_2$O mole fraction of x=0.5 and differing SiO$_2$:M$_2$O mole ratios, y, was prepared according to the amounts listed in Table 7. In one experiment a potassium silicate solution, KASIL® #1, having a SiO$_2$:K$_2$O mole ratio of 4 was used. With continuous stirring, distilled water, potassium polysilicate solution, lithium polysilicate solution, and Ludox® colloidal silica were combined in the order given. The resulting coating solutions had 10% total solids and had SiO$_2$:M$_2$O mole ratios, y, between 3.64 and 10.0. Analogous solutions containing 10% solids of the alkali metal polysilicates and no additional colloidal silica were prepared as comparative samples.

TABLE 7

Recipes for the Preparation of Lithium-Potassium Copolysilicate Barrier Coatings Having Various SiO$_2$:M$_2$O Mole Ratios, y and an Equimolar Ratio of Lithium to Potassium Oxides

| Si$_2$O:M$_2$O Mole Ratio (y) | Source of Colloidal Silica (Ludox ®) | Mass of colloidal Silica (g) | Source of Potassium Polysilicate | Mass of Potassium Polysilicate (g) | Mass of Inobond ® Li 2043 (g) | Mass of Distilled Water (g) |
|---|---|---|---|---|---|---|
| 3.64 | None | — | K-4009 | 12.89 | 7.66 | 69.37 |
| 3.99 | None | — | KASIL ® #1 | 18.84 | 16.50 | 64.74 |
| 3.99 | HS-40 | 1.73 | K-4009 | 12.02 | 16.50 | 69.79 |
| 5.00 | HS-40 | 5.60 | K-409 | 10.00 | 13.68 | 70.63 |

TABLE 7-continued

Recipes for the Preparation of Lithium-Potassium Copolysilicate Barrier Coatings Having Various $SiO_2:M_2O$ Mole Ratios, y and an Equimolar Ratio of Lithium to Potassium Oxides

| $Si_2O:M_2O$ Mole Ratio (y) | Source of Colloidal Silica (Ludox®) | Mass of colloidal Silica (g) | Source of Potassium Polysilicate | Mass of Potassium Polysilicate (g) | Mass of Inobond® Li 2043 (g) | Mass of Distilled Water (g) |
|---|---|---|---|---|---|---|
| 5.00 | AS-30 | 7.47 | K-4009 | 10.00 | 13.70 | 68.80 |
| 5.00 | CL-X | 4.98 | K-4009 | 10.01 | 13.73 | 71.30 |
| 7.00 | HS-40 | 10.44 | K-4009 | 7.52 | 10.34 | 71.75 |
| 7.00 | AS-30 | 13.90 | K-4009 | 7.49 | 10.28 | 68.22 |
| 7.00 | CL-X | 9.27 | K-4009 | 7.52 | 10.31 | 72.91 |
| 10.00 | HS-40 | 14.45 | K-4009 | 5.45 | 7.50 | 72.64 |

B. Preparation of Coated Film Samples

Four inch circles were cut from biaxially oriented PET film (Hoechst Diafoil, Hostaphan® 2400, 0.5 mil thick) with a scalpel. Any dust on the film was blown off with a jet of clean filtered air. The film samples were then plasma treated to improve wetting by barrier coating solutions and adhesion of dried barrier coatings. Plasma treatment was performed using a Plasma Preen microwave reactor operated at 50% power with 2 Torr of oxygen. The treatment duration was about 7 s.

Approximately 10 g of coating solution was dispensed onto the polymer film. A spreading spin cycle of 2 s at 350 rpm was followed by a spin cycle of 10 s at 2000 rpm. The coated films were dried in an oven maintained at 50° C. for about 30 s.

C. Oxygen Barrier Performance

Oxygen transmission rates were measured using a Mocon Oxtran 2000 instrument. Samples were tested at 23° C. and 50% relative humidity. Table 8 presents oxygen transmission rates as a function of $SiO_2:M_2O$ mole ratio, y, for a series of lithium-potassium copolysilicate barrier coatings with a lithium oxide mole fraction in $(Li_2O)_x(K_2O)_{1-x}(SiO_2)_y$, x=0.5. As a point of reference, uncoated 0.5 mil thick PET film has an OTR of ~115 $cm^3/(m^2$ day atm) at 23° C. and 50% relative humidity. These results demonstrate that good barrier performance can be achieved in copolysilicate barrier coatings with $SiO_2:M_2O$ mole ratios as high as 10. However, the range of $SiO_2:M_2O$ mole ratios that yield satisfactory barrier performance depends on the identity of the colloidal silica source.

TABLE 8

Oxygen Transmission Rates of Lithium-Potassium Copolysilicate Barrier Coatings on 0.5 mil thick PET film vs. $SiO_2:M_2O$ Ratio

| $Si_2O:M_2O$ Mole Ratio | Source of Colloidal Silica | Source of Potassium Polysilicate | OTR ($cm^3/[m^2$ day atm] at 23° C. and 50% relative humidity |
|---|---|---|---|
| 3.64 | None | K-4009 | 0.83 |
| 3.64 | None | K-4009 | 0.28 |
| 3.99 | None | KASIL® #1 | 0.34 |
| 3.99 | None | KASIL® #1 | 0.17 |
| 3.99 | HS-40 | K-4009 | 0.52 |
| 3.99 | HS-40 | K-4009 | 0.39 |
| 5.00 | HS-40 | K-4009 | 0.35 |
| 5.00 | HS-40 | K-4009 | 0.33 |
| 5.00 | AS-30 | K-4009 | 1.06 |
| 5.00 | AS-30 | K-4009 | 0.23 |
| 5.00 | CL-X | K-4009 | 0.23 |
| 5.00 | CL-X | K-4009 | 0.29 |
| 7.00 | HS-40 | K-4009 | 0.93 |
| 7.00 | HS-40 | K-4009 | 0.48 |
| 7.00 | AS-30 | K-4009 | 0.65 |
| 7.00 | AS-30 | K-4009 | 0.55 |
| 7.00 | CL-X | K-4009 | 11.80 |
| 7.00 | CL-X | K-4009 | 12.84 |
| 10.00 | HS-40 | K-4009 | 1.89 |
| 10.00 | HS-40 | K-4009 | 1.40 |

EXAMPLE 5

Simultaneous Variation of $SIO_2:M_2O$ Mole Ratio, y, and Mole Fraction of $Li_2O$, x, in $(Li_2O)_x(K_2O)_{1-x}(SiO_2)_y$ Copolysilicate Coatings on Biaxially Oriented Pet Film

A. Preparation of Coating Solutions

A series of lithium-potassium copolysilicate barrier coating solutions were prepared according to the amounts listed in Table 9. With continuous stirring, distilled water, K-4009 potassium polysilicate solution, Inobond® Li 2043 lithium polysilicate solution, and Ludox® AS-30 colloidal suspension of silicon dioxide containing 30% solids (DuPont Specialty Chemicals) were combined in the order given. The resulting coating solutions had 10% total solids and had $SiO_2:M_2O$ mole ratios, y values of between 3.51 and 13. Analogous solutions containing 10% solids of the individual alkali metal polysilicates were prepared as comparative samples.

TABLE 9

Recipes for the Preparation of Lithium-Potassium Copolysilicate Barrier Coatings Having Various $SiO_2:M_2O$ Mole Ratios and $Li_2O$ Mole Fractions

| Solution | Mole Fraction of $Li_2O$ x | $Si_2O:M_2O$ Mole Ratio y | Mass of K-4009 (g) | Mass of Inobond ® Li 2043 (g) | Mass of Ludox ® AS-30 (g) | Mass of Distilled Water (g) |
|---|---|---|---|---|---|---|
| 1 | 0.00 | 4.05 | 42.94 | 0.00 | 9.63 | 147.43 |
| 2 | 0.00 | 7.67 | 26.12 | 0.00 | 1.97 | 141.91 |
| 3 | 0.00 | 15.0 | 14.57 | 0.00 | 47.31 | 138.12 |
| 4 | 0.33 | 4.05 | 30.57 | 20.95 | 6.85 | 141.62 |
| 5 | 0.50 | 9.5 | 11.46 | 15.71 | 37.05 | 135.79 |
| 6 | 0.50 | 9.5 | 11.46 | 15.71 | 37.05 | 135.79 |
| 7 | 0.50 | 15 | 7.53 | 10.32 | 47.21 | 134.95 |
| 8 | 0.67 | 4.05 | 16.40 | 44.96 | 3.68 | 134.97 |
| 9 | 1.00 | 4.05 | 0.00 | 72.73 | 0.00 | 127.27 |
| 10 | 1.00 | 11.33 | 0.00 | 27.98 | 41.02 | 131.00 |
| 11 | 1.00 | 15.0 | 0.00 | 21.35 | 47.09 | 131.55 |

B. Preparation of Coated Film Samples

Four inch circles were cut from biaxially oriented PET film (Hoechst Diafoil, Hostaphan® 2400, 0.5 mil thick), with a scalpel. Any dust on the film was blown off with a jet of clean, filtered air. The samples were then plasma treated with a Plasma Preen microwave reactor operated at 50% power and 2 Torr of oxygen. The treatment time was 5 s. Approximately 10 g of coating solution was dispensed onto the polymer film. A spreading spin cycle of 2 s at 50 rpm was followed by a spin cycle of 10 s at 2000 rpm. The coated films were dried in an oven maintained at 50° C. for about 30 s. Several coated film samples were prepared with each coating solution described in Table 9.

C. Measurement of Oxygen Transmission Rates

Oxygen transmission rates were measured using a Mocon Oxtran 2000 instrument. Table 10 presents the oxygen transmission rate results for biaxially oriented PET film (0.5 mil thick) coated with copolysilicate barrier layers having various $SiO_2:M_2O$ mole ratios, y, and $Li_2O$ mole fractions, x, in $(Li_2O)_x(K_2O)_{1-x}(SiO_2)_y$ as a function of relative humidity. As a point of reference, uncoated Hostaphan® 2400 grade PET film (0.5 mil thick) possesses an oxygen transmission rate of approximately 115 $cm^3/[m^2$ day atm] when tested at 23° C. and 0% relative humidity.

TABLE 10

Oxygen Transmission Rates of Lithium-Potassium Copolysilicate Barrier Coatings on 0.5 mil thick PET film vs. $SiO_2:M_2O$ Ratio and Mole Fraction of $Li_2O$

| $SiO_2:M_2O$ Mole Ratio y | Mole Fraction of $Li_2O$ x | Relative Humidity (%) | OTR $(cm^3/[m^2$ day atm] at 23° C.) |
|---|---|---|---|
| 15.0 | 0.00 | 90 | 93 |
| 7.67 | 0.00 | 0 | 30 |
| 11.3 | 1.00 | 90 | 68 |
| 15.0 | 1.00 | 90 | 91 |
| 9.5 | 0.50 | 45 | 46 |
| 4.05 | 0.00 | 30 | 9.75 |
| 4.05 | 1.00 | 60 | 11 |
| 7.67 | 0.00 | 90 | 98 |
| 15.0 | 0.00 | 0 | 128 |
| 4.05 | 0.67 | 0 | 0.7 |
| 15.0 | 1.00 | 0 | 125 |
| 4.05 | 0.33 | 90 | 80 |
| 4.05 | 0.67 | 90 | 24 |
| 11.3 | 1.00 | 0 | 56 |
| 15.0 | 0.50 | 45 | 107 |
| 4.05 | 1.00 | 30 | 0.39 |
| 4.05 | 0.33 | 0 | 2.15 |
| 4.05 | 0.00 | 60 | 4.38 |

EXAMPLE 6

Roll Coating of Lithium-Potassium Copolysilicate Barrier Coating Onto Biaxially Oriented Pet Film A. Preparation of Coating Solutions With continuous stirring, 4,513 g KASIL® #1 potassium polysilicate solution (PQ Corporation) having 8.30% w/w $K_2O$ and 20.8% w/w $SiO_2$ was mixed with 11,535 g distilled water. To the stirring potassium polysilicate solution was added 3,951 g Inobond® Li-2043 lithium polysilicate solution. The resulting coating solution had a total solids level of 12%. The values of x and y in $(Li_2O)_x(K_2O)_{1-x}(SiO_2)_y$ were 0.5 and 4.0, respectively.

B. Preparation of Coated Films

Biaxially oriented PET film (Hoechst Diafoil, Hostaphan® 2400, 0.5 mil thick), was coated with the copolysilicate solution described above using roll coating at a speed of 200 fpm. Corona discharge treatment was used to increase the surface energy of the film surface immediately prior to application of the coating. Application of the coating was achieved with the use of a gravure cylinder in a reverse gravure configuration with a hard rubber backing roll. The ceramic-coated gravure cylinder possessed a laser engraved cell pattern with 220 lines per inch arranged at a 60 degree angle to the roll axis and a theoretical cell volume of 10 billion cubic microns per square inch.

C. Measurement of Oxygen Transmission Rate

Oxygen transmission rates were measured using a Mocon Oxtran 2000 instrument. The average oxygen transmission rate obtained for 12 representative samples selected from the coated film was 0.77±0.38 $cm^3/[m^2$ day atm] at 23° C. and 50% relative humidity. As a point of reference, uncoated 0.5 mil Hostaphan® 2400 grade PET film possesses an oxygen transmission rate of approximately 115 $cm^3/[m^2day$ atm] when tested at 23° C. and 50% relative humidity.

EXAMPLE 7

Copolysilicate Coated Thick Pet Film

A. Preparation of Coating Solutions

A lithium-potassium copolysilicate barrier coating solution having values of x and y in $(Li_2O)_x(K_2O)_{1-x}(SiO_2)_y$ of 0.5 and 3.64, respectively, was prepared by adding, with continuous stirring, 176.8 g of Inobond® Li 2043 lithium polysilicate and 129.0 g of K-4009 potassium polysilicate to 694.2 g of distilled water.

B. Preparation of Coated Film Samples

Four inch circles were cut from biaxially oriented PET film (Hoechst Diafoil, Hostaphan® 4000, 6.5 mil thick) with a circular punch and scissors. Dust on the film was blown off with a jet of clean, filtered air. The film samples were then corona treated to improve wetting by barrier coating solutions and adhesion of dried barrier coatings. Corona treatment was performed using a Tantec Lab System II with hand-held ceramic roller electrode. The treatment duration was about 20 s. Spin coating of the films was accomplished by dispensing approximately 10 g of coating solution onto the polymer film. A spreading spin cycle of 2 s at 350 rpm was followed by a spin cycle of 10 s at 2000 rpm. The coated films were dried in an oven maintained at 50° C. for about 30 s.

C. Measurement of Oxygen Transmission Rate

Oxygen transmission rates were measured using a Mocon Oxtran 2000 instrument. Samples were tested at 23° C. and either 0 or 48% relative humidity. Table 11 presents oxygen transmission rate results for thick biaxially oriented poly (ethylene terephthalate) film (6.5 mil thick) uncoated or coated with copolysilicate barrier layers. Note that the OTR of uncoated PET film is inversely dependent on film thickness ~8 $cm^3/[m^2$ day atm] for 6.5 mil film vs. ~115 $cm^3/[m^2$ day atm] for 0.5 mil film at 23° C. (see Example 5). In contrast, the oxygen transmission rate of copolysilicate-coated biaxially oriented PET film is independent of substrate thickness. Thus the relative barrier improvement achievable for thick substrates is less than for thin substrates.

TABLE 11

Oxygen Transmission Rates of Lithium-Potassium Copolysilicate Barrier Coatings on 6.5 mil PET Film

| Sample | Relative Humidity (%) | $O_2$ Transmission Rate ($cm^3/[m^2$ day atm] at 23° C.) |
|---|---|---|
| Uncoated | 0 | 7.25 |
| Uncoated | 0 | 8.06 |
| Uncoated | 0 | 7.72 |
| Average | 0 | 7.68 ± 0.33 |
| Coated | 0 | 0.54 |
| Coated | 48 | 0.40 |
| Coated | 48 | 0.22 |
| Average | 48 | 0.31 ± 0.09 |

EXAMPLE 8

Copolysilicate Barrier Coatings on Pet Bottles

This example demonstrates the oxygen barrier performance achieved by spray coating PET bottles with lithium-potassium copolysilicate barrier coatings. The main differences between coating PET film and bottles are (1) the greater thickness of bottle walls, typically 14 mil vs. the 0.5 mil or 6.5 mil film used in preceding examples, and (2) the process of spray coating. One skilled in the art of spray coating can achieve conditions that produce uniform barrier coating layers of appropriate thickness to achieve acceptable barrier performance.

A. Preparation of Coating Solutions

Two lithium-potassium copolysilicate barrier coating solutions having a values of x and y of 0.5 and 3.64 respectively, for $(Li_2O)_x(K_2O)_{1-x}(SiO_2)_y$, were prepared for spray coating. The first coating solution, called Barrier 1 for this example, was prepared by adding, with continuous stirring, 70.7 g of Inobond® Li 2043 lithium polysilicate and 51.56 g of K-4009 potassium polysilicate to 1,877 g of distilled water. The second coating solution, called Barrier 2 for this example, was prepared by adding 0.195 g of Genapol® 26-L-60-N (Hoechst Celanese), an alkyl ethoxylate surfactant, to a 1003.35 g aliquot of Barrier 1. Each solution contained a total of 2.0% solids by weight. The solutions were thoroughly mixed immediately before spray coating.

B. Preparation of Coated Bottles

Twenty ounce injection stretch blow-molded PET bottles (Hoechst Celanese T-80 PET resin) were cleaned by wiping with acetone-soaked towlettes. Dried bottles were plasma treated to improve wetting by barrier coating solutions and adhesion of dried copolysilicate layers. Copolysilicate barrier solution was applied with a Badger air sprayer. Bottles were dried in an oven maintained at ~80° C. for several minutes.

C. Measurement of Oxygen Transmission Rates

Oxygen transmission rates were measured using a Mocon Oxtran 2000 instrument with a package test module maintained at 30° C. and 0% relative humidity. Table 12 presents the oxygen transmission rate values for an oxygen partial pressure difference of 0.21 atm across the PET bottle wall, i.e. air on the outside, pure nitrogen on the inside. These data demonstrate an approximate two-fold decrease in oxygen transmission rate effected with a lithium-potassium copolysilicate barrier layer.

TABLE 12

Oxygen Transmission Rates of Lithium-Potassium Copolysilicate Barrier Coatings on PET Bottles

| Sample ID | Coating | OTR ($cm^3$/[pkg day] at 30° C., 0% Relative Humidity and 21% $O_2$ Atm.) |
|---|---|---|
| C1 | None | 0.082 |
| C2 | None | 0.081 |
| C3 | None | 0.078 |
| C4 | None | 0.073 |
| C5 | None | 0.077 |
| Average | None | 0.078 ± 0.003 |
| F019704 | Barrier 1 | 0.052 |
| F019706 | Barrier 1 | 0.039 |
| F019707 | Barrier 1 | 0.032 |
| F019708 | Barrier 1 | 0.058 |
| F019709 | Barrier 1 | 0.059 |
| F019711 | Barrier 1 | 0.052 |
| Average | Barrier 1 | 0.049 ± 0.010 |
| F019716 | Barrier 2 | 0.055 |
| F019717 | Barrier 2 | 0.045 |
| F019718 | Barrier 2 | 0.056 |
| F019720 | Barrier 2 | 0.055 |
| F019721 | Barrier 2 | 0.053 |
| Average | Barrier 2 | 0.053 ± 0.004 |

EXAMPLE 9

Carbon Dioxide Barrier Performance of Copolysilicate Coated Biaxially Oriented Pet Films Samples of the lithium:potassium copolysilicate coated biaxially oriented poly(ethylene terephthalate) film described in Example 6 were tested for carbon dioxide permeability. The average carbon dioxide transmission rate obtained for 4 representative samples selected from the coated film was 16±11 $cm^3/[m^2$ day atm] at 23° C. and 0% relative humidity. As a point of reference, uncoated 0.5 mil Hostaphan® 2400 grade poly(ethylene terephthalate) film possesses a carbon dioxide transmission rate of approximately 440 $cm^3/[m^2$ day atm] when tested at 23° C. and 0% relative humidity.

EXAMPLE 10

Aroma Barrier Performance of Copolysilicate-Coated, Biaxially-Oriented Polypropylene Film A. Preparation of Coating Solution A lithium-potassium copolysilicate barrier coating solution having values of x and y of 0.5 and 3.64 for $(Li_2O)_x$ $(K_2O)_{1-x}(SiO_2)_y$, respectively, was prepared using Inobond® Li 2043 lithium polysilicate, K-4009 potassium polysilicate, and water using the method described in Example 1. The resulting solution had a total solids level of 12% by weight.

B. Preparation of Coated Film Sample

Biaxially-oriented polypropylene film (Trespaphan® FND 20, 0.8 mil thick) was corona treated, then primed with a poly(vinyl alcohol) solution by reverse gravure coating. The primed film was coated with the copolysilicate solution described in this example using roll coating at a speed of 200 fpm. Application of the coating was achieved with the use of a gravure cylinder in a reverse gravure configuration with a hard rubber backing roll. The ceramic-coated gravure cylinder possessed a laser-engraved cell pattern with 220 lines per inch arranged at a 60° angle relative to the roll axis and a theoretical cell volume of 10 billion cubic microns per square inch.

C. Measurement of Aroma Barrier

Aroma barrier performance was tested using cinnamaldehyde as a permeant. The cinnamaldehyde transmission rates of uncoated and copolysilicate-coated film (measured with liquid cinnamaldehyde in contact with the uncoated side of the film) are 0.095 g/(m² day) and 0.022 g/(m² day) at 23° C., respectively.

EXAMPLE 11

Copolysilicate Coated Cycloolefinic Copolymer Film

A. Preparation of Solutions

A lithium-potassium copolysilicate barrier coating solution having values of x and y of 0.5 and 3.64 respectively, for $(Li_2O)_x(K_2O)_{1-x}(SiO_2)_y$, was prepared using Inobond® Li 2043 lithium polysilicate, K-4009 potassium polysilicate, and water using the method described in Example 1. The resulting solution had a total solids level of 10% by weight.

B. Preparation of Coated Film

Four inch circles were cut from a corona-treated, biaxially oriented film of cycloolefinic copolymer, a copolymer of ethylene and norbornene, 0.8 mil thick, with a scalpel. Any dust on the film was blown off with a jet of clean, filtered air. Approximately 10 g of coating solution was dispensed onto the polymer film and subjected to a spin cycle of 10 s at 2000 rpm. The coated films were dried in an oven maintained at 50° C. for about 30 s.

C. Measurement of Oxygen Transmission Rate

Oxygen transmission rates were measured using a Mocon Oxtran 2000 instrument at 30° C. and 0% relative humidity. The polysilicate coated film exhibited an OTR of 28 cm³/[m² day atm] whereas an uncoated film exhibited an OTR of 2819 cm³/[m² day atm] under the same conditions.

Application of the method of this invention, and utilizing the improved coating compositions of the present invention result in a much less severe loss of barrier performance at high humidities than pure potassium polysilicates and develop haze at about half (when x~0.5) the rate of pure lithium polysilicates. More specifically, the lithium-potassium copolysilicate coatings of the present invention reduce the rate of efflorescence of pure lithium polysilicates without sacrificing the barrier qualities of such lithium-polysilicate coatings. The present invention lithium-potassium polysilicate coatings provide superior barrier properties with reduced negative side-effects caused by efflorescence.

All references and patents cited above are incorporated herein by reference. Numerous modifications and variations of the present invention are included in the above-identified specification and are expected to be obvious to one of skill in the art. Such modifications and alterations to the compositions and processes of the present invention are believed to be encompassed in the scope of the claims appended hereto.

What is claimed is:

1. An aqueous barrier coating solution for polymeric substrates comprising a lithium-potassium copolysilicate of the formula $(M_2O)(SiO_2)_y$, wherein $M_2O$ is $(Li_2O)_x(K_2O)_{1-x}$ and wherein x ranges from 0.5 to less than 1, and y ranges from 1 to about 10, said solution comprising about up to 15% total solids content.

2. The coating solution according to claim 1 wherein x is between 0.5 and 1 and y is between 4.6 and 10.

3. The coating solution according to claim 1 additionally comprising a suitable surfactant.

4. The coating solution according to claim 1, wherein the surfactant is non-ionic.

5. The coating solution according to claim 4 wherein the surfactant is selected from the group consisting of acetylenic glycols and alkyl ethoxylates.

6. The coating solution according to claim 1 wherein said coating is a barrier to a vapor, a gas or an aroma.

7. The aqueous solution according to claim 1, said solution comprising about 12% total solids content.

8. The aqueous solution according to claim 1, said solution comprising about 10% total solids content.

9. The aqueous solution according to claim 1, said solution comprising about 2% total solids content.

10. The aqueous solution according to claim 1, said solution comprising about 85% water content.

11. The aqueous solution according to claim 1, said solution additionally comprising about 1 wt. % priming solution.

12. The aqueous solution according to claim 11, wherein said priming solution is poly(p-hydroxystyrene).

13. The aqueous solution according to claim 1, wherein said solution is colorless and transparent.

14. An aqueous barrier coating solution for polymeric substrates comprising a lithium-potassium copolysilicate of the formula $(M_2O)(SiO_2)_y$, wherein $M_2O$ is $(Li_2O)_x(K_2O)_{1-x}$ and wherein x is about 0.83 and y is about 3.91, said solution comprising up to about 15% total solids content.

* * * * *